US009476182B2

(12) United States Patent
Nakanishi et al.

(10) Patent No.: US 9,476,182 B2
(45) Date of Patent: Oct. 25, 2016

(54) WORK VEHICLE

(71) Applicant: KOMATSU LTD., Tokyo (JP)

(72) Inventors: Junichi Nakanishi, Kanazawa (JP); Yosuke Kondo, Komatsu (JP)

(73) Assignee: KOMATSU LTD., Tokyo (JP)

( * ) Notice: Subject to any disclaimer, the term of this patent is extended or adjusted under 35 U.S.C. 154(b) by 235 days.

(21) Appl. No.: 14/383,145

(22) PCT Filed: Jun. 30, 2014

(86) PCT No.: PCT/JP2014/067451
§ 371 (c)(1),
(2) Date: Sep. 5, 2014

(87) PCT Pub. No.: WO2014/185553
PCT Pub. Date: Nov. 20, 2014

(65) Prior Publication Data
US 2016/0237645 A1   Aug. 18, 2016

(51) Int. Cl.
*B62D 21/18* (2006.01)
*E02F 9/08* (2006.01)
*E02F 3/76* (2006.01)

(52) U.S. Cl.
CPC .......... *E02F 9/0816* (2013.01); *B62D 21/186* (2013.01); *E02F 3/7636* (2013.01); *E02F 9/0883* (2013.01)

(58) Field of Classification Search
CPC ... B62D 21/02; B62D 21/186; E02F 9/0816; E02F 3/7636; E02F 9/0883
USPC ............... 296/190.03, 203.01; 280/756, 795
See application file for complete search history.

(56) References Cited

U.S. PATENT DOCUMENTS

| | | | |
|---|---|---|---|
| 6,347,678 B1 | 2/2002 | Osborn et al. | |
| 7,641,234 B1* | 1/2010 | Pelnar | B60R 21/13 180/900 |
| 8,807,633 B2* | 8/2014 | Milburn | B62D 33/0604 280/756 |
| 8,973,692 B1* | 3/2015 | Okuda | B60L 11/1877 180/68.5 |
| 2005/0087971 A1* | 4/2005 | Studebaker | B62D 21/02 280/781 |
| 2006/0125228 A1 | 6/2006 | Studebaker et al. | |

(Continued)

FOREIGN PATENT DOCUMENTS

CN   201729193 U   2/2011
JP   55-153280 U   11/1980

(Continued)

OTHER PUBLICATIONS

Office Action for the corresponding Chinese patent application No. 201480000834.0, issued on Dec. 31, 2015.

(Continued)

*Primary Examiner* — Jason S Morrow
(74) *Attorney, Agent, or Firm* — Global IP Counselors, LLP

(57) ABSTRACT

A work vehicle is provided with a vehicle frame, and a support bracket. The vehicle frame includes a first side plate, and a second side plate. The support bracket is arranged spanning the first side plate, and the second side plate. The first joint of the support bracket connects a first lower end of a support bracket body and the first side plate. The first joint extends upward from the side surface of the first side plate. The second joint of the support bracket connects a second lower end of a bracket body and the second side plate. The second joint extends upward from the side surface of the second side plate.

19 Claims, 10 Drawing Sheets

(56) References Cited

U.S. PATENT DOCUMENTS

| | | | |
|---|---|---|---|
| 2007/0257503 A1 | 11/2007 | Ball et al. | |
| 2010/0187799 A1* | 7/2010 | Schmidt | B60R 21/131 280/756 |
| 2010/0320807 A1* | 12/2010 | Shioji | B62D 21/186 296/203.04 |
| 2015/0090511 A1* | 4/2015 | Okuda | B60K 13/04 180/89.2 |
| 2015/0151577 A1* | 6/2015 | Tipton | B60B 35/005 280/124.116 |
| 2015/0299981 A1* | 10/2015 | Hayashi | E02F 9/0866 180/309 |

FOREIGN PATENT DOCUMENTS

| | | |
|---|---|---|
| JP | 2003-25858 A | 1/2003 |
| JP | 2008-110773 A | 5/2008 |
| WO | 2008/069297 A1 | 6/2008 |

OTHER PUBLICATIONS

The International Search Report for the corresponding international application No. PCT/JP2014/067451, issued on Sep. 2, 2014.

* cited by examiner

WORK VEHICLE

CROSS-REFERENCE TO RELATED APPLICATIONS

This application is a U.S. National stage application of International Application No. PCT/JP2014/067451, filed on Jun. 30, 2014.

BACKGROUND

1. Field of the Invention

The present invention relates to a work vehicle.

2. Background Information

A work vehicle, such as a motor grader, uses a work implement to perform a desired task. The work implement is driven by hydraulic fluid pressurized by a hydraulic pump. The hydraulic fluid is stored in a hydraulic fluid tank. For example, the work vehicle described in Japanese Unexamined Patent Application Publication No. 2008-110773 supports the hydraulic fluid tank above the vehicle frame. More specifically, a support bracket mounted on the upper surface of the vehicle frame supports the hydraulic fluid tank.

SUMMARY

Elastic deformation, such as twisting of the vehicle frame, occurs while the work vehicle is traveling or performing tasks. For example, when a work vehicle, such as a motor grader, travels along an uneven road surface, the right rear wheel or the left rear wheel may rise above the road.

In such a case, the weight of the raised rear wheel adds stress to the vehicle frame. The stress added to the vehicle frame brings about detrimental effects where the vehicle frame and the support bracket are attached. This issue is not limited to the support bracket that supports the hydraulic fluid tank but also occurs for other objects supported by the support bracket in the same manner.

The present invention addresses this problem by providing a work vehicle wherein it is possible to stably attach the support bracket to the vehicle frame.

A work vehicle according to an aspect of the present invention is provided with a vehicle frame, and a support bracket. The vehicle frame includes a first side plate and a second side plate. The first side plate is disposed on a first side relative to the center in the vehicle width direction. The first side plate extends fin a longitudinal direction. The second side plate is disposed on a second side relative to the center in the vehicle width direction. The second side plate extends in the longitudinal direction. The support bracket is arranged spanning the first side plate and the second side plate. The support bracket supports an object above the vehicle frame. The support bracket includes a bracket body, a first joint, and a second joint. The bracket body includes a first lower end and a second lower end. The first lower end is disposed on the first side relative to the center in the vehicle width direction. The second lower end is disposed on the second side relative to the center in the vehicle width direction. The first joint connects the first lower end of the support bracket and the first side plate. The first joint extends upward from the side surface of the first side plate. The second joint connects the second lower end of the support bracket and the second side plate. The second joint extends upward from the side surface of the second side plate.

When the vehicle frame elastically deforms due to the weight of, for instance, a raised wheel, stress is applied to the upper surface of the first side plate and the upper surface of the second side plate. However, according to the above configuration, the first joint extends upward from the side surface of the first side plate, and is not anchored to the upper surface of the first side plate. Therefore, the first joint may be stably attached to the first side plate. The second joint may be stably attached to the second side plate in the same manner.

The first joint preferably includes a first anchor, a first pillar, and a first attachment. The first anchor is secured to the first side plate at the vertical center part of the first side plate. The first pillar is arranged next to the first side plate with a gap therebetween. The first pillar extends upward from the first anchor. The first lower end of the bracket body is attached to the first attachment.

When the vehicle frame elastically deforms due to the weight of, for instance, a raised wheel, little stress is applied at the vertical center part of the first side plate. In this manner, a first joint configured as above is secured at the vertical center part of the first side plate, and therefore the first joint may be stably attached to the first side plate.

The first attachment preferably extends in the longitudinal direction. According to this configuration, the first lower end of the bracket body may be easily attached to the first attachment.

The second joint preferably includes a second anchor, a second pillar, and a second attachment. The second anchor is secured to the second side plate at the vertical center part of the second side plate. The second pillar is arranged next to the second side plate with a gap therebetween. The second pillar extends upward from the second anchor. The second lower end of the bracket body is attached to the second attachment.

When the vehicle frame elastically deforms due to the weight of, for instance, a raised wheel, little stress is applied at the vertical center part of the second side plate. In this manner, a second joint configured as above is secured at the vertical center part of the second side plate, and therefore the second joint may be stably attached to the second side plate.

The second attachment preferably extends in the longitudinal direction. According to this configuration, the second lower end of the bracket body may be easily attached to the second attachment.

Preferably, the first joint is less rigid than the first lower end of the bracket body. Preferably, the second joint also is preferably less rigid than the second lower end of the bracket body. According to this configuration, the bracket body is attached to the vehicle frame by way of the first and second joints. Therefore, even when the vehicle frame elastically deforms, the elastic deformation does not affect the bracket body directly. More specifically, elastic deformation of the vehicle frame propagates to the bracket through the first and second joints. However the first and second joints are less rigid than the bracket body. Therefore, the first and second joints may suppress the effects on the bracket body of the elastic deformation of the vehicle frame.

The first lower end of the bracket body preferably includes a first front leg and a first rear leg. The first front leg extends downward. The first rear leg is arranged behind the first front leg. The first rear leg extends downward. The first joint connects the first front leg or the first rear leg, and the first side plate. The second lower end includes a second front leg and a second rear leg. The second front leg extends downward. The second rear leg is arranged behind the second front leg. The second rear leg extends downward. The second joint connects the second front leg or the second rear leg, and the second side plate.

Preferably, the support bracket body further includes a third joint, and a fourth joint. The third joint extends upward from the side surface of the first side plate. The third joint connects the first front leg of the bracket body and the first side plate. The fourth joint extends upward from the side surface of the second side plate. The fourth joint connects the second front leg of the bracket body and the second side plate. The first joint connects the first rear leg of the bracket body and the first side plate. The second joint connects the second rear leg of the bracket body and the second side plate.

Preferably, the third joint is less rigid than the first front leg. Preferably, the fourth joint is less rigid than the second front leg.

Preferably, the work vehicle further includes a first rigid component and a second rigid component. The first rigid component is attached to the inner surface of the first side plate. The second rigid component is attached to the inner surface of the second side plate. The first joint may be attached to the outer surface of the first side plate. The second joint may be attached to the outer surface of the second side plate.

According to this configuration the first rigid component can prevent twisting of the first side plate itself. As a result, the first joint may be stably attached to the first side plate. The second rigid component can prevent twisting of the second side plate itself. As a result, the second joint may be stably attached to the second side plate.

In the longitudinal direction, the first joint is preferably attached to the first side plate further behind the front end of the first rigid component, and further in front of the rear end of the first rigid component.

In the longitudinal direction, the second joint is preferably attached to the second side plate further behind the front end of the second rigid component, and further in front of the rear end of the second rigid component.

The present invention provides a work vehicle wherein it is possible to stably attach the support bracket to the vehicle frame.

DESCRIPTION OF EXEMPLARY EMBODIMENTS

Figure 1:
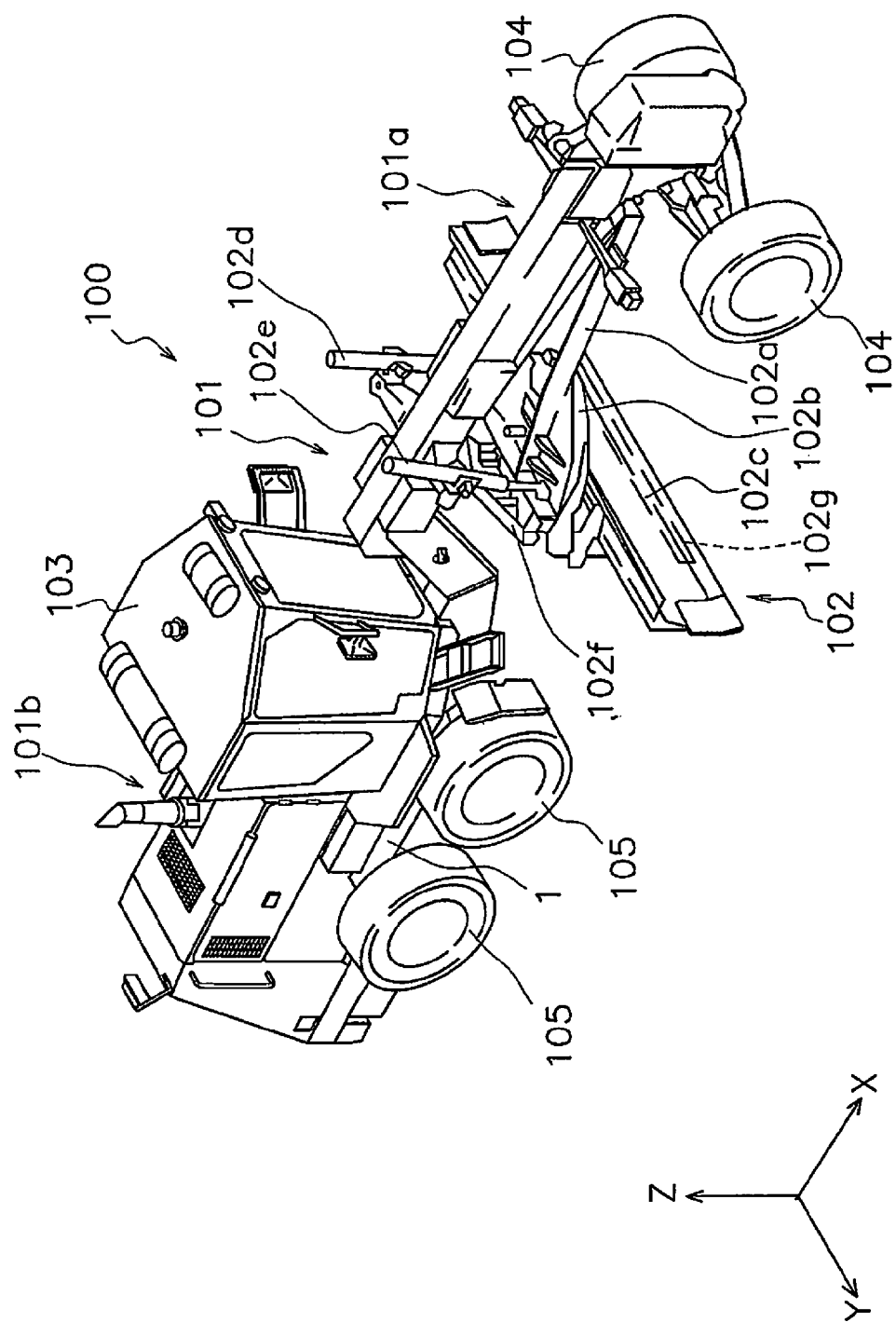
FIG. 1 is a perspective view of the motor grader.
Figure 2:
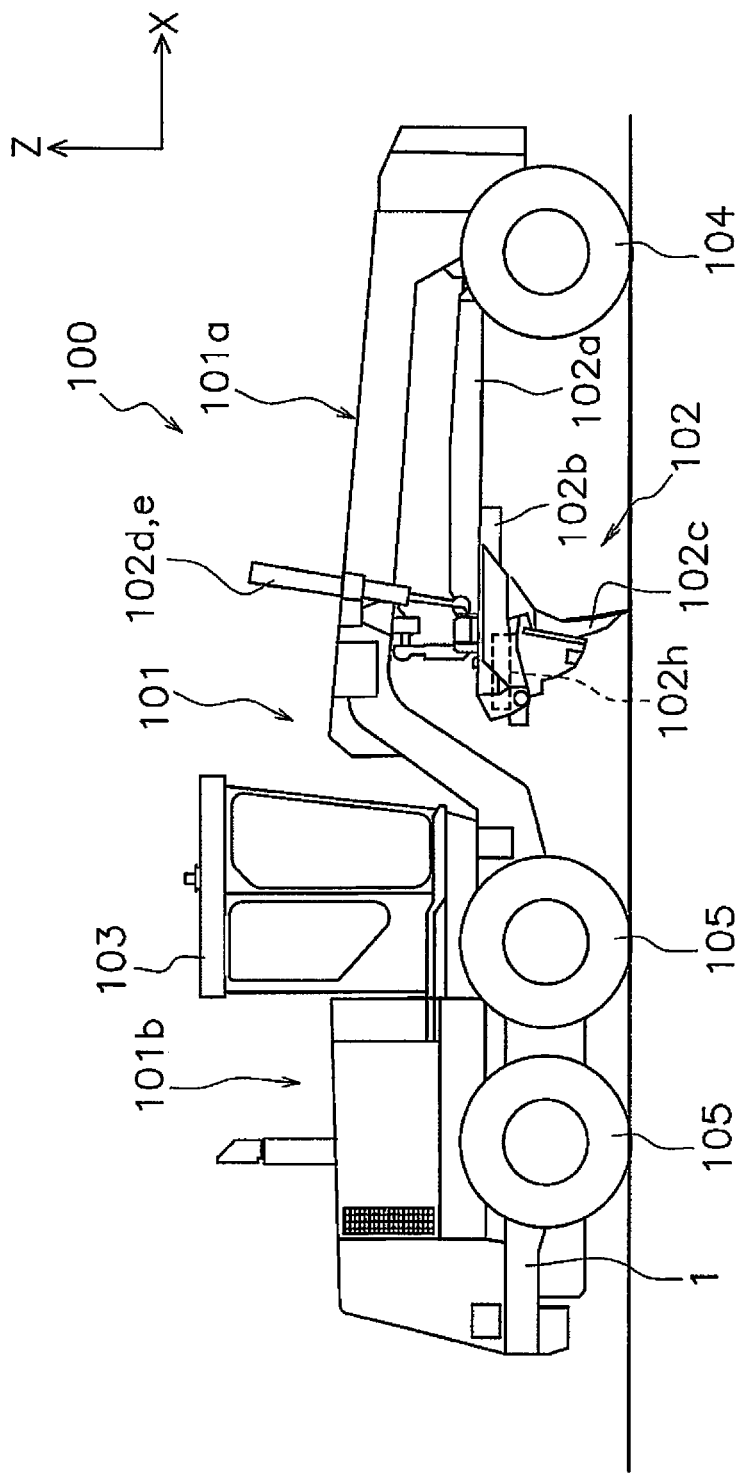
FIG. 2 is a side view of the motor grader.

A motor grader 100 according to the exemplary embodiments will be described below with reference to the drawings. FIG. 1 is a perspective view of the motor grader 100. FIG. 2 is a side view of the motor grader 100. It is to be noted that in the following description "right", "left", "up", and "down" indicate the respective directions when looking frontward from the cabin. The term "vehicle width direction" is synonymous with the term "horizontal direction". Additionally, the term "longitudinal direction" means the longitudinal direction of the vehicle. In the drawings, the X-axis represents the longitudinal direction, the Y-axis represents the vehicle width direction, and the Z-axis represents the vertical direction. Furthermore, "center in the vehicle width direction" indicates the center of the motor grader 100 in the vehicle width direction.

As illustrated in FIG. 1 and FIG. 2, the motor grader 100 is provided with a vehicle body 101, a work implement 102, and a cab 103. The motor grader 100 may use the work implement 102 for soil preparation, snow removal, light cutting, or materials mixing.

The vehicle body 101 includes a front vehicle body 101a and a rear vehicle body 101b. The front vehicle body 101a may include a plurality (for instance, two) front wheels 104. Each of the front wheels 104 is arranged at the front portion of the front vehicle body 101a.

The work implement 102 includes a drawbar 102a, a circle 102b, a blade 102c, and a plurality of hydraulic cylinders 102d-102h. The blade 102c can be raised and lowered vertically, change inclination in the longitudinal direction, change inclination horizontally, rotate, and shift horizontally via the drawbar 102a and the circle 102b.

The rear vehicle body 101b is located behind the front vehicle body 101a. The rear vehicle body 101b may include a plurality of (for instance, four) rear wheels 105. The rear wheels 105 are rotatably driven with drive power from the engine to thereby cause the motor grader 100 to move. The rear vehicle body 101b includes a vehicle frame 1.

Figure 3:
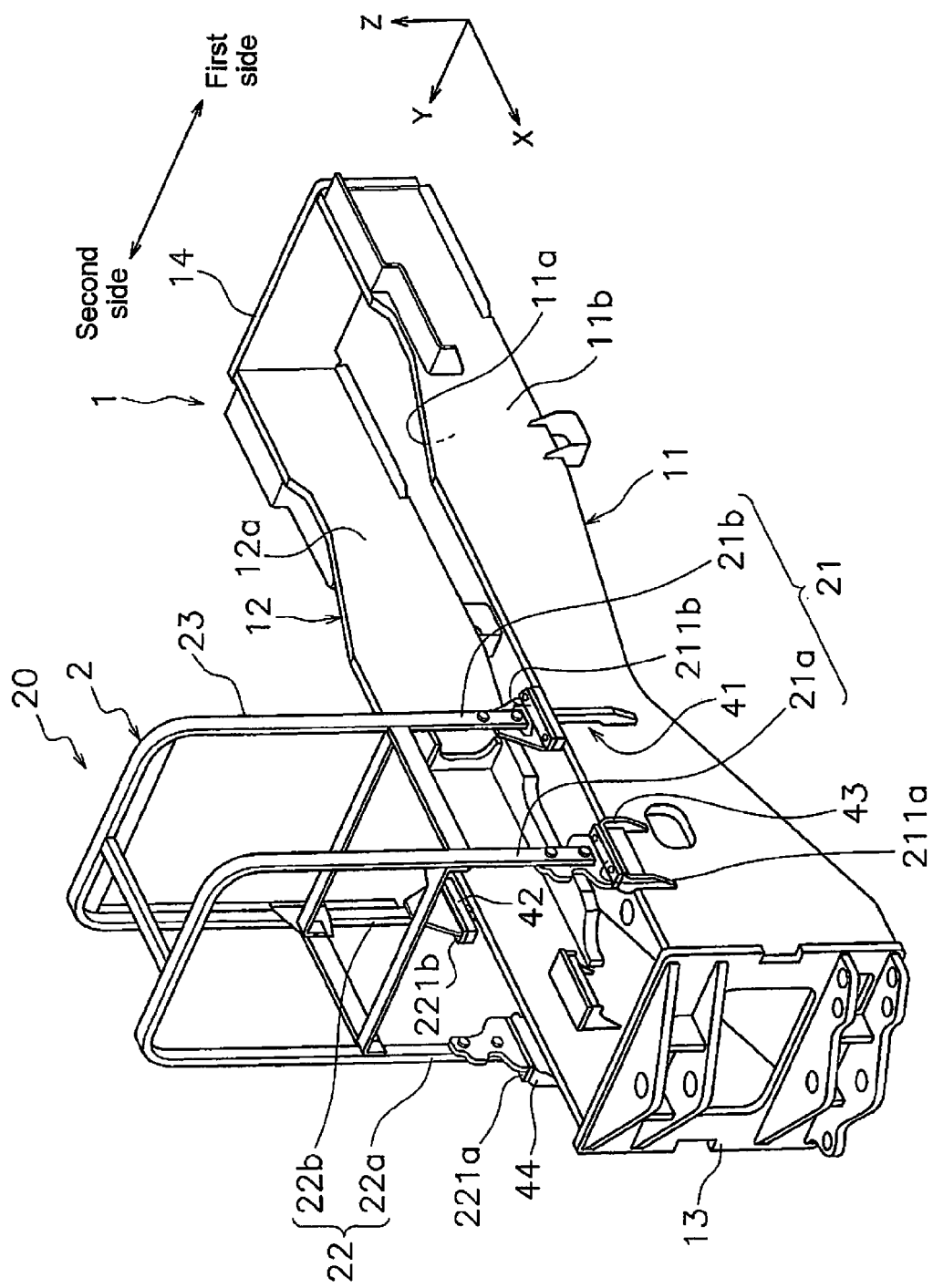
FIG. 3 is a perspective view of the vehicle frame.

FIG. 3 is a perspective view of the vehicle frame 1. As illustrated in FIG. 3, the vehicle frame 1 includes a first side plate 11 and a second side plate 12. The first side plate 11 is arranged on a first side relative to the center in the vehicle width direction. More specifically, the first side plate 11 is arranged on the left side relative to the center in the vehicle width direction. The first side plate 11 extends in the longitudinal direction.

The second side plate 12 is arranged on a second side relative to the center in the vehicle width direction. More specifically, the second side plate 12 is arranged on the right side relative to the center in the vehicle width direction. The second side plate 12 extends in the longitudinal direction.

The first side plate 11 and the second side plate 12 face each other with a space in the vehicle width direction. The inner surface 11a of the first side plate 11, and the inner surface 12a of the second side plate 12 face each other. The first side plate 11 and the second side plate 12 are connected by a front plate 13 and a rear plate 14 that extend in the vehicle width direction. The first side plate 11 and the second side plate 12 are substantially bilaterally symmetrical. The first side plate 11 and the second side plate 12 are made of steel. For example, the first side plate 11 and the second side plate 12 may be made from rolled steel, and more specifically made of SS400 (defined in Japanese Industrial Standards JIS G 3101).

Figure 4:
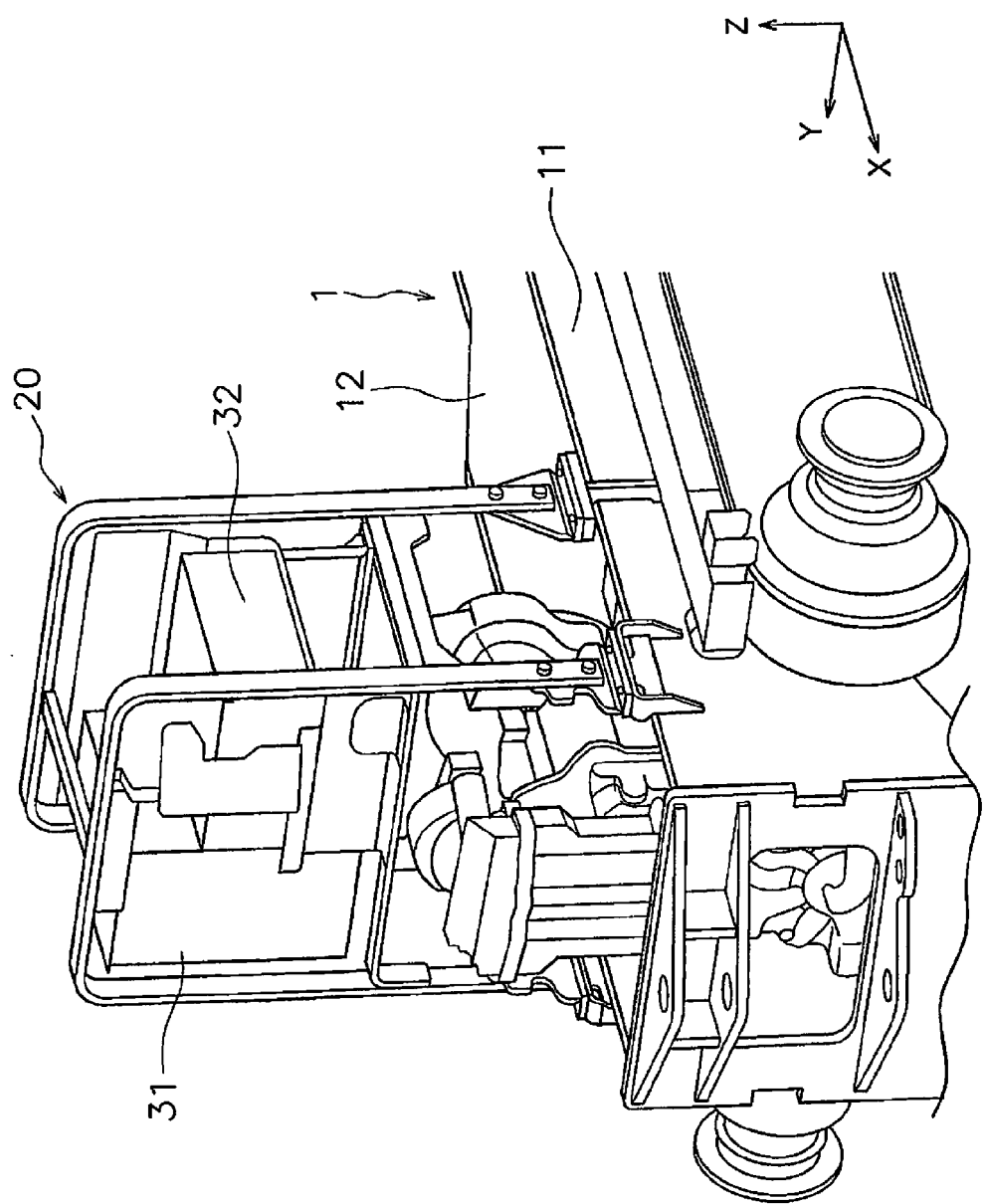
FIG. 4 is a perspective view of the bracket body.

The support bracket 20 is arranged spanning the first side plate 11 and the second side plate 12. The support bracket 20 supports an object above the vehicle frame 1. More specifically, as illustrated in FIG. 4 the support bracket 20 supports a hydraulic fluid tank 31. Besides that, the support bracket 20 also supports a battery 32, and the like. The support bracket 20 is arranged above the front of the vehicle frame 1. Moreover, a torque converter, a transmission, and the like may be arranged below the support bracket 2.

As illustrated in FIG. 3, the support bracket 20 includes a bracket body 2, and a plurality of joints 41-44. For instance, the support bracket 20 includes first through fourth joints 41-44.

The bracket body 2 includes a first lower end 21, and a second lower end 22. The bracket body 2 includes a main supporting part 23. The main supporting part 23 is configured to support the above-described objects. The bracket body 2 is longer in the vehicle width direction than in the longitudinal direction in plan view; however, the bracket body 2 is not particularly limited to this configuration. That is, the bracket body 2 is a landscape-oriented rectangle in plan view.

The first lower end 21 is arranged on the first side relative to the center in the vehicle width direction. The second lower end 22 is arranged on the second side relative to the center in the vehicle width direction. More specifically, the first lower end 21 is arranged on the left side relative to the center in the vehicle width direction. The second lower end 22 is arranged on the right side relative to the center in the vehicle width direction. The first lower end 21 is arranged near the first side plate 11, and the second lower end 22 is arranged near the second side plate 12.

The first lower end 21 extends downward from the main supporting part 23. More specifically, the first lower end 21 extends downward from the left end of the main supporting part 23. The first lower end 21 includes a first front leg 21a, and a first rear leg 21b.

The first front leg 21a, and the first rear leg 21b extend downward. More specifically, the first front leg 21a extends downward from the front end on the left part of the main supporting part 23. The first rear leg 21b extends downward from the rear end on the left part of the main supporting part 23. That is, the first rear leg 21b is arranged behind the first front leg 21a. The first front leg 21a, and the first rear leg 21b respectively include bases 211a, 211b that extend in the longitudinal direction.

The second lower end 22 extends downward from the main supporting part 23. More specifically, the second lower end 22 extends downward from the right end of the main supporting part 23. The second lower end 22 includes a second front leg 22a, and a second rear leg 22b.

The second front leg 22a, and the second rear leg 22b extend downward. More specifically, the second front leg 22a extends downward from the front end on the right part of the main supporting part 23. The second rear leg 22b extends downward from the rear end on the right part of the main supporting part 23. That is, the second rear leg 22b is arranged behind the second front leg 22a. The second front leg 22a, and the second rear leg 22b respectively include bases 221a, 221b that extend in the longitudinal direction.

The bracket body 2 is attached to the vehicle frame 1 by way of the first through fourth joints 41-44. The first through fourth joints 41-44 connect the vehicle frame 1 and the bracket body 2.

The first joint 41 connects the first lower end 21 of the bracket body 2 and the first side plate 11. More specifically, the first joint 41 connects the first rear leg 21b of the bracket body 2 and the first side plate 11. The first joint 41 extends upward from the side surface of the first side plate 11. More specifically, the first joint 41 extends upward from the outer surface 11b of the first side plate 11. The first joint 41 is made of steel. For instance, the first joint 41 may be made from rolled steel, and more specifically may be made of SS400 (defined in Japanese Industrial Standards JIS G 3101).

Figure 5:
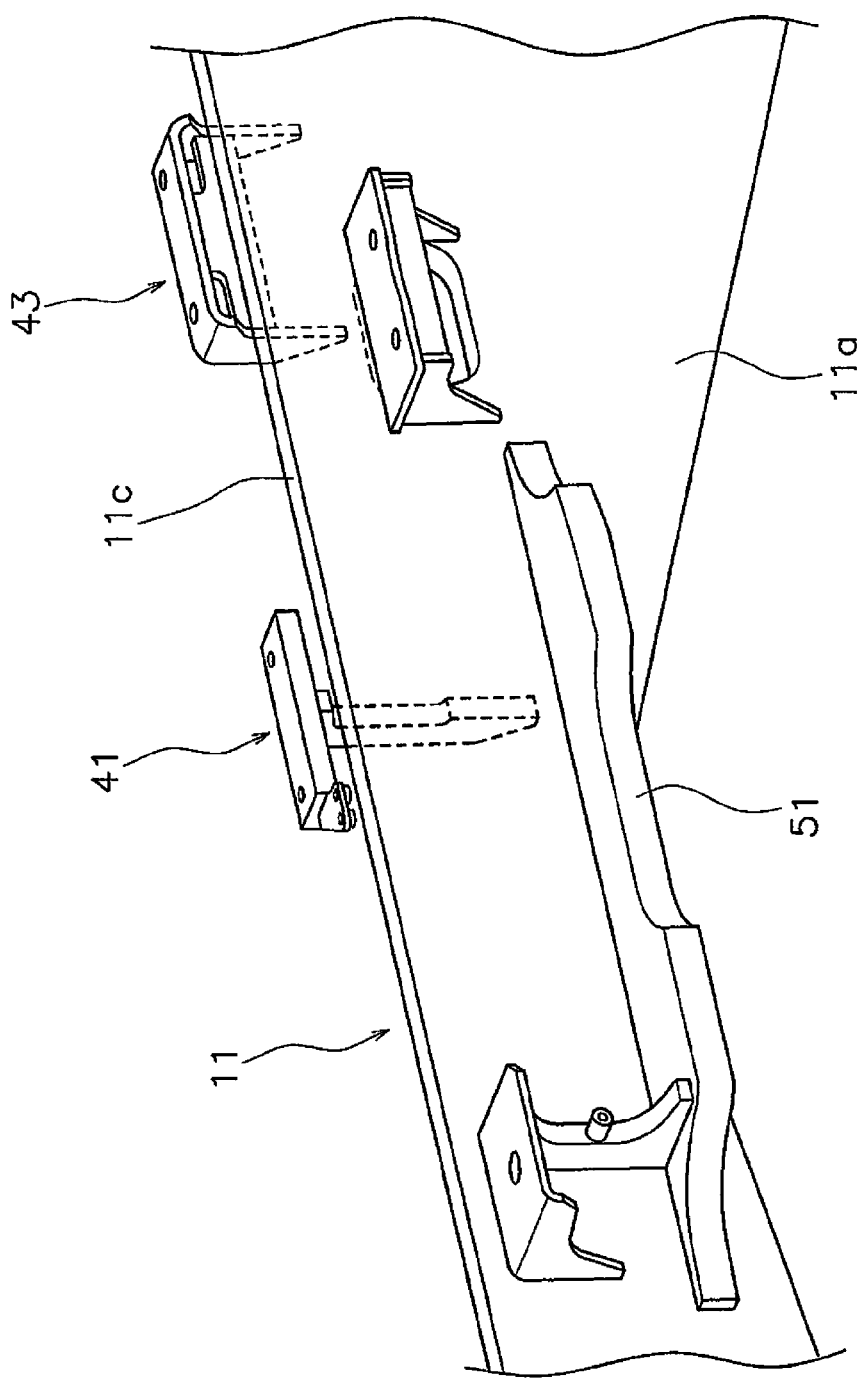
FIG. 5 is a perspective view of the first side plate.

FIG. 5 is a perspective view of the first side plate 11. As illustrated in FIG. 5, the first joint 41 is not secured to the upper surface 11c of the first side plate 11. More specifically, the first joint 41 is not in contact with the upper surface 11c of the first side plate 11.

The first joint 41 is less rigid than the bracket body 2. More specifically, the first joint 41 is less rigid than the first rear leg 21b of the bracket body 2.

Figure 6:
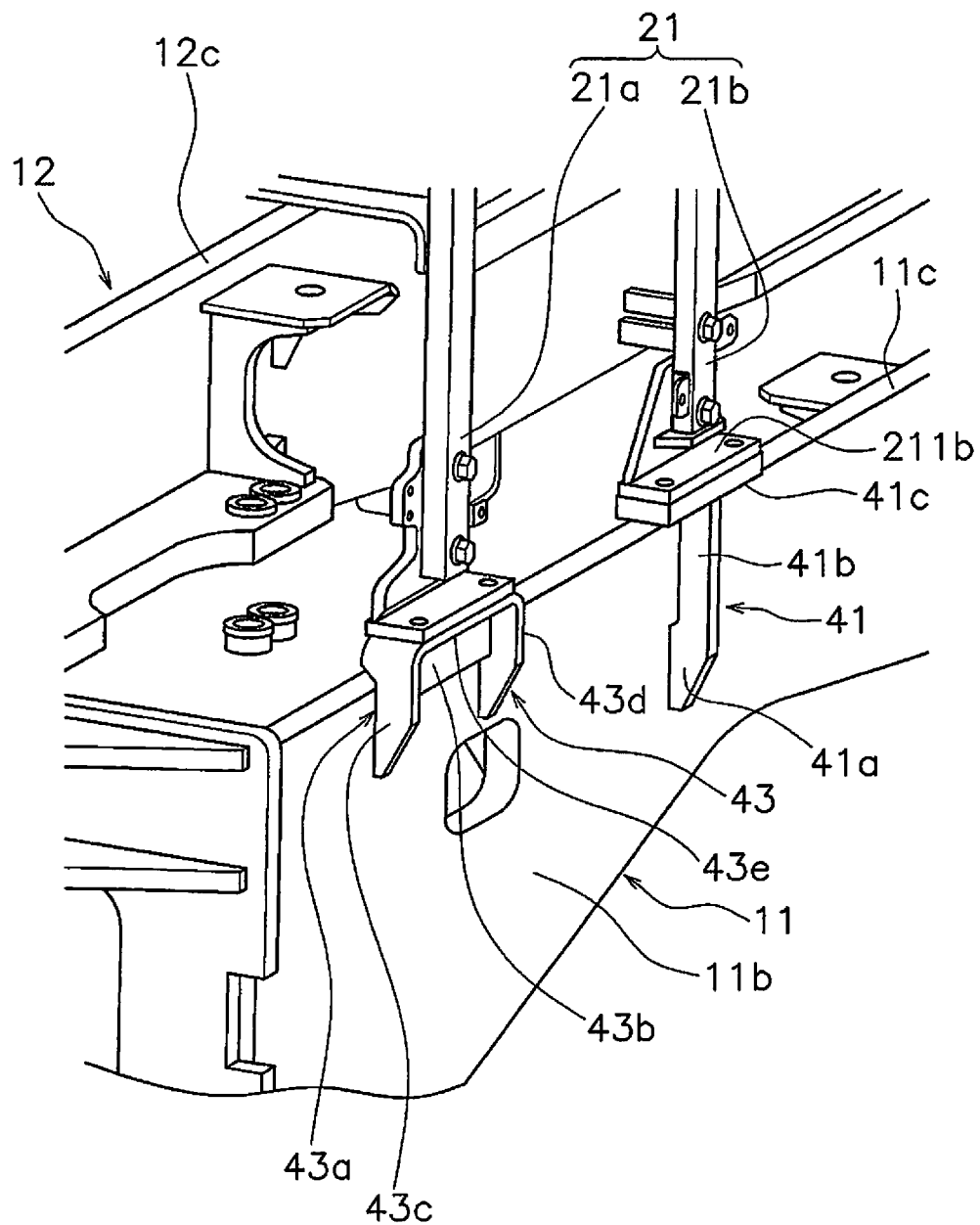
FIG. 6 is a perspective view of the first joint.

FIG. 6 is a perspective view of the first joint 41. As illustrated in FIG. 6, the first joint 41 includes a first anchor 41a, a first pillar 41b, and a first attachment 41c. The first anchor 41a is secured to the first side plate 11 at the vertical center part of the first side plate 11. For example, the first anchor 41a is secured to the outer surface 11b of the first side plate 11. The first anchor 41a may be welded to the first side plate 11.

Figure 7:
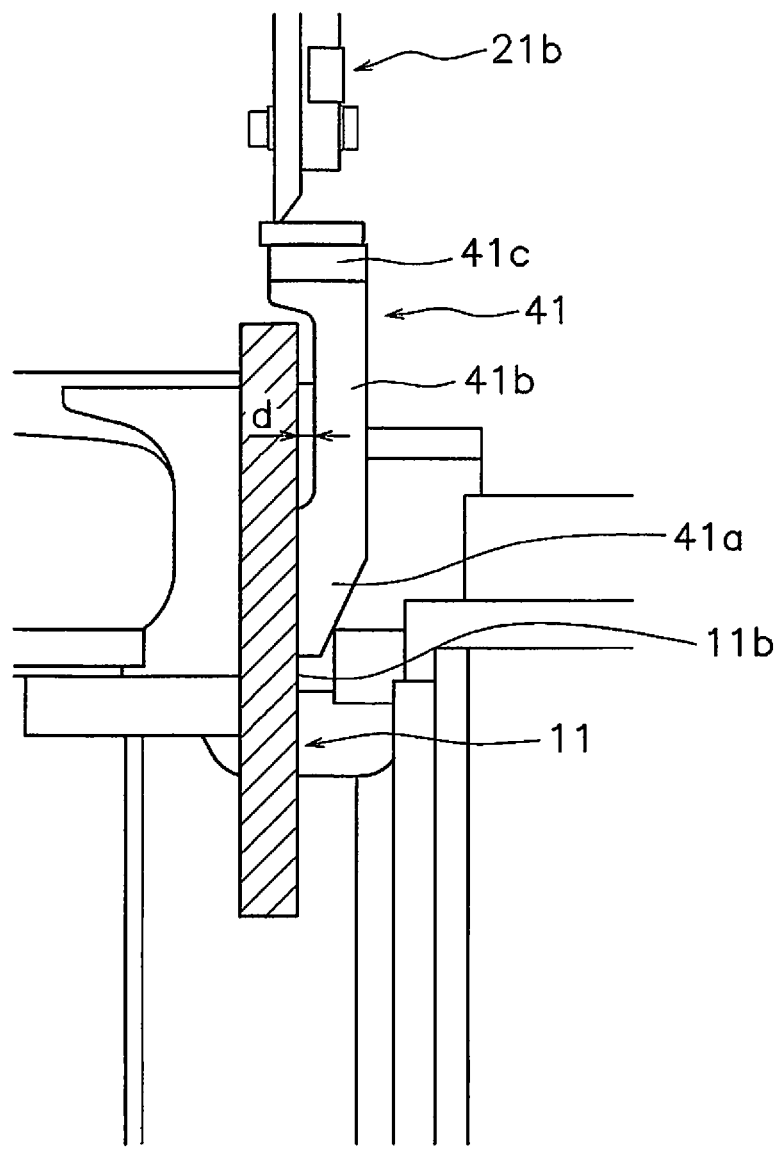
FIG. 7 is a front view of the first joint.

FIG. 7 illustrates the first joint 41 as viewed from the front. As illustrated in FIG. 7, the first pillar 41b extends upward from the first anchor 41a. Additionally the first pillar 41b is arranged next to the first side plate 11 with a gap therebetween. More specifically, the first pillar 41b is arranged next to the outer surface 11b of the first side plate 11 with a gap "d" therebetween. That is, the first pillar 41b and the first side plate 11 are not in contact. The gap "d" between the first pillar 41b and the first side plate 11 may be between roughly 5 mm and 10 mm inclusive. The longitudinal length of the first pillar 41b is shorter than the longitudinal length of the first rear leg 21b. Therefore the first joint 41 is less rigid than the first rear leg 21b.

As illustrated in FIG. 6, the first lower end 21 of the bracket body 2 is attached to the first attachment 41c. More specifically, the first rear leg 21b of the bracket body 2 is attached to the first attachment 41c. The first attachment 41c extends in the longitudinal direction. The first attachment 41c is connected to the upper end of the first pillar 41b. The first rear leg 21b is attached to the first attachment 41c above the first side plate 11. For example, the first rear leg 21b is attached to the first attachment 41c using a fastener, such as a bolt. The bolt is inserted from underneath the first attachment 41c.

Figure 8:
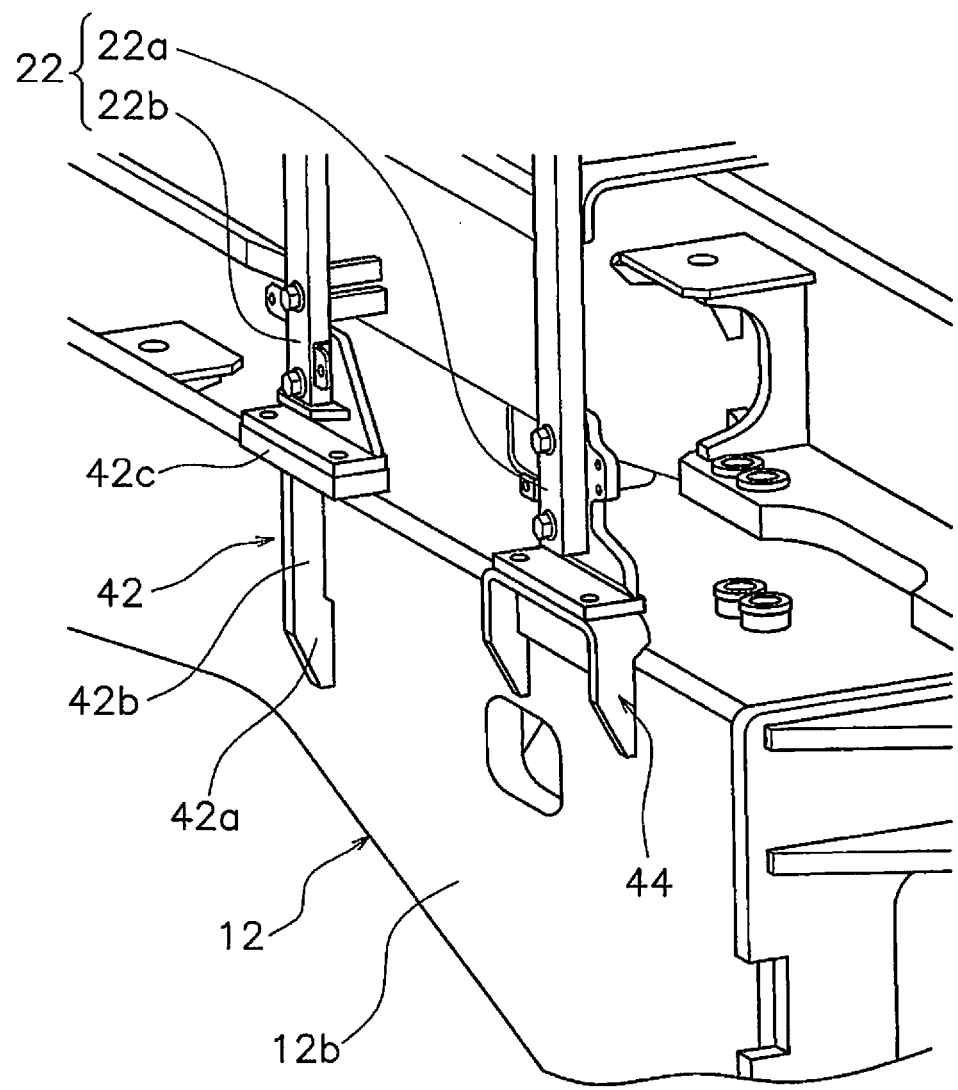
FIG. 8 is a perspective view of the second joint.

FIG. 8 is a perspective view of the second joint 42. As illustrated in FIG. 8, the second joint 42 connects the second lower end 22 of the bracket body 2 and the second side plate 12. More specifically, the second joint 42 connects the second rear leg 22b of the bracket body 2 and the second side plate 12. The second joint 42 extends upward from the side surface of the second side plate 12. More specifically, the second joint 42 extends upward from the outer surface 12b of the second side plate 12.

Figure 9:
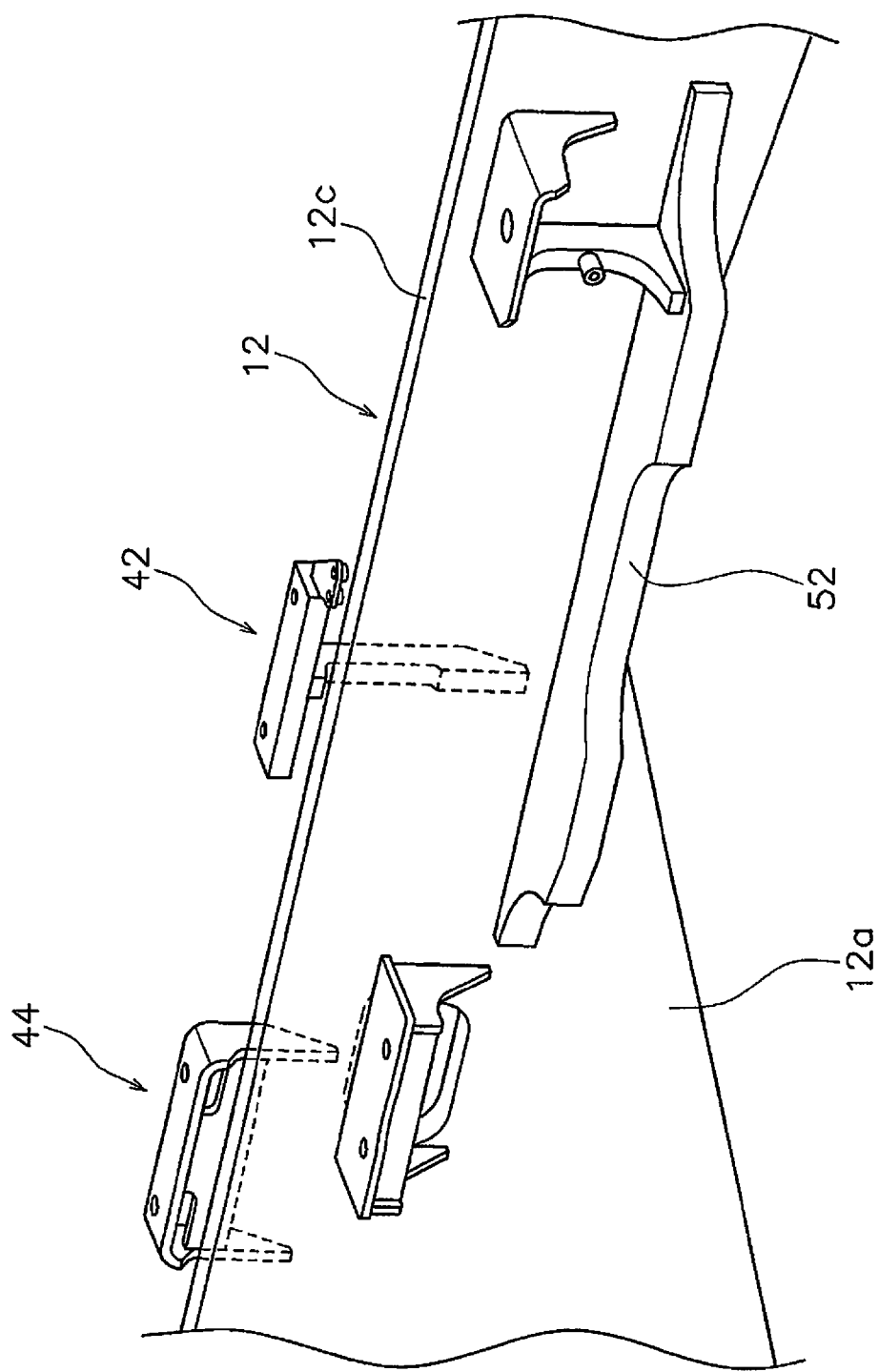
FIG. 9 is a perspective view of the second side plate.

FIG. 9 is a perspective view of the second side plate 12. As illustrated in FIG. 9, the second joint 42 is not secured to the upper surface 12c of the second side plate 12. More specifically, the second joint 42 is not in contact with the upper surface 12c of the second side plate 12.

As illustrated in FIG. 8, the second joint 42 is less rigid than the bracket body 2. More specifically, the second joint 42 is less rigid than the second rear leg 22b. The second joint 42 includes a second anchor 42a, a second pillar 42b, and a second attachment 42c. The second joint 42 has the same configuration as the first joint 41 and therefore a detailed explanation thereof is omitted.

Figure 10:
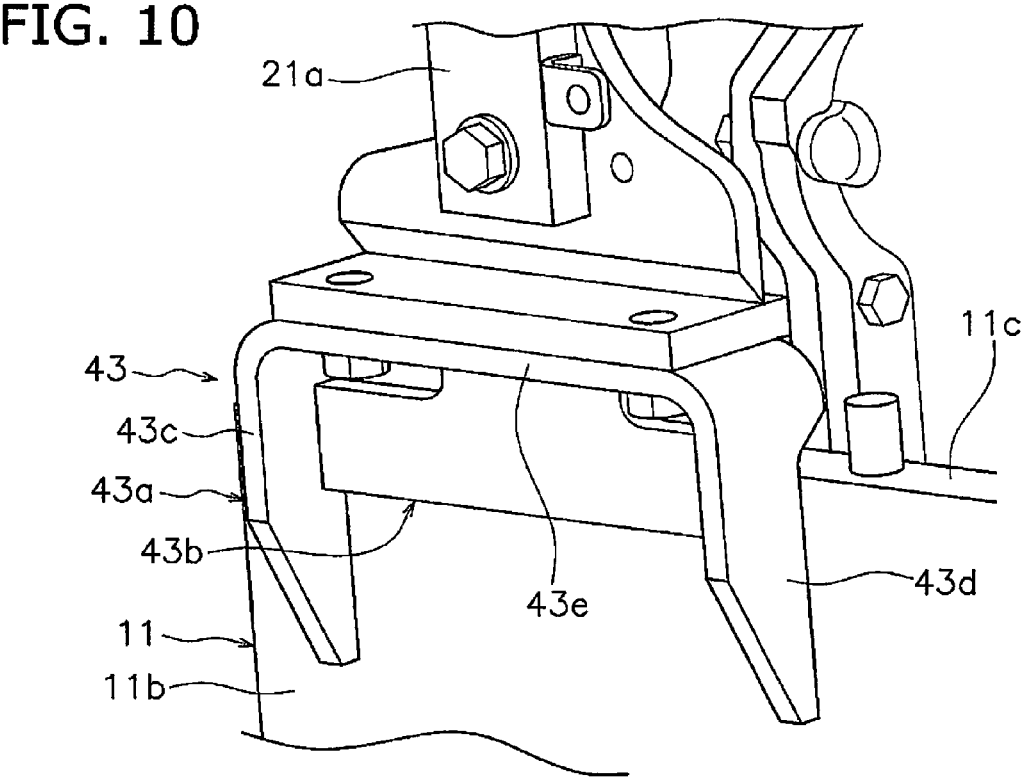
FIG. 10 is a perspective view of the third joint.

FIG. 10 is a perspective view of the third joint 43. As illustrated in FIG. 10, the third joint 43 connects the first front leg 21a of the bracket body 2 and the first side plate 11. The third joint 43 is secured to the outer surface 11b of the first side plate 11. The third joint 43 is not secured to the upper surface 11c of the first side plate 11. More specifically, the third joint 43 is not in contact with the upper surface 11c of the first side plate 11.

The third joint 43 includes a main section 43a and a horizontal section 43b. The main section 43a includes a front plate section 43c, a rear plate section 43d, and an upper plate section 43e. The front plate section 43c, the rear plate section 43d, and the upper plate section 43e may be made from a single component. More specifically, the front plate section 43c, the rear plate section 43d, and the upper plate section 43e may be made by bending a single sheet of a panel.

The front plate section 43c, and the rear plate section 43d are secured to the outer surface 11b of the first side plate 11. More specifically, the front plate section 43c and the rear plate section 43d are welded to the outer surface 11b of the first side plate 11.

The upper plate section 43e extends in the longitudinal direction. The upper plate section 43e is not secured to the upper surface 11c of the first side plate 11. More specifically, the upper plate section 43e is not in contact with the first side plate 11. The first front leg 21a of the bracket body 2 is attached to the upper plate section 43e. For example, the first front leg 21a is attached to the first upper plate section 43e using a fastener, such as a bolt. The bolt is inserted from below the upper plate section 43e.

The horizontal section 43b extends between the front plate section 43c and the rear plate section 43d, respectively connecting the front plate section 43c and that the rear plate section 43d. The horizontal section 43b is also secured to the outer surface 11b of the first side plate 11.

Figure 11:
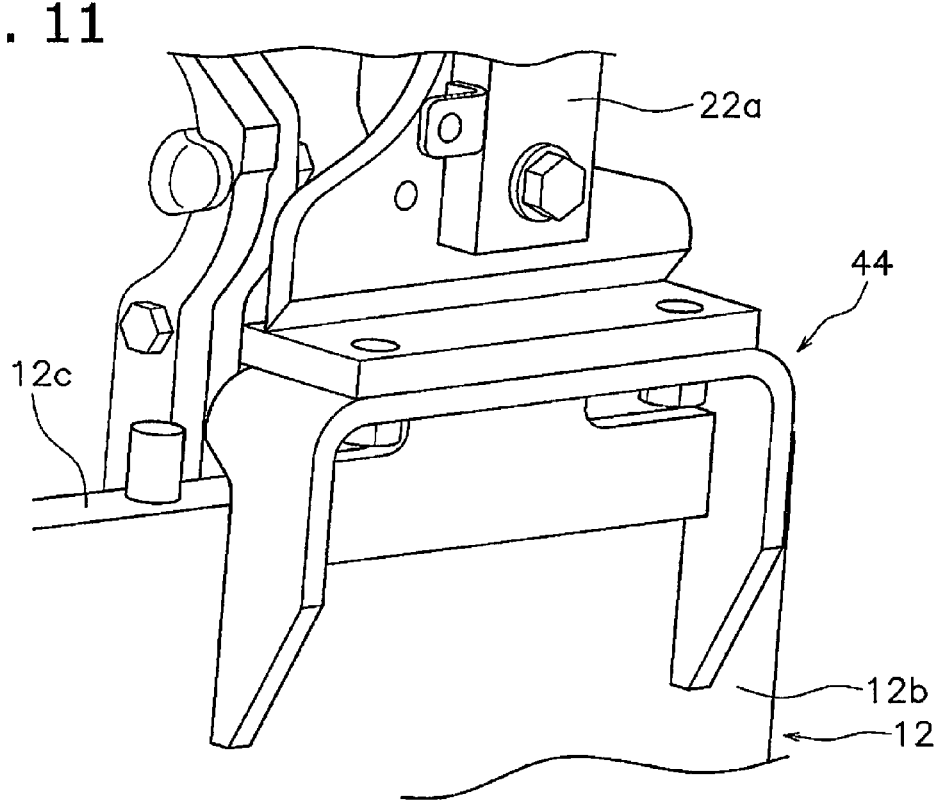
FIG. 11 is a perspective view of the fourth joint.

FIG. 11 is a perspective view of the fourth joint 44. As illustrated in FIG. 11, the fourth joint 44 connects the second front leg 22a of the bracket body 2 and the second side plate 12. The fourth joint 44 is secured to the outer surface 12b of the second side plate 12. More specifically, the fourth joint 44 is welded to the outer surface 12b of the second side plate 12. The fourth joint 44 is not secured to the upper surface 12c of the second side plate 12. More specifically, the fourth joint 44 is not in contact with the upper surface 12c of the second side plate 12.

The fourth joint 44 has the same configuration as the third joint 43 and therefore a detailed explanation thereof is omitted.

As illustrated in FIG. 5, the first rigid component 51 is attached to the inner surface 11a of the first side plate 11. Attaching the first rigid component 51 improves the rigidity of the first side plate 11. The first joint 41 is attached to the first side plate 11 further behind the front end of the first rigid component 51, and further in front of the rear end of the first rigid component 51 in the longitudinal direction. The first joint 41 is also attached to the first side plate 11 near the first rigid component 51 in the vertical direction. Moreover, the first rigid component 51 is configured to support an axle device (not shown). The first rigid component 51 is made of steel. For instance, the first rigid component 51 may be made from rolled steel, and more specifically may be made of SS400 (defined in Japanese Industrial Standards JIS G 3101). The first rigid component 51 extends in the longitudinal direction.

As illustrated in FIG. 9, the second rigid component 52 is attached to the inner surface 12a of the second side plate 12. Attaching the second rigid component 52 improves the rigidity of the second side plate 12. The second joint 42 is attached to the second side plate 12 further behind the front end of the second rigid component 52, and further in front of the rear end of the second rigid component 52 in the longitudinal direction. The second joint 42 is also attached to the second side plate 12 near the second rigid component 52 in the vertical direction. Moreover, the second rigid component 52 may be configured to support the axle device (not shown). The second rigid component 52 is made of steel. For instance, the second rigid component 52 may be made from rolled steel, and more specifically may be made of SS400 (defined in Japanese Industrial Standards JIS G 3101). The second rigid component 52 extends in the longitudinal direction.

The bracket body 2 of the motor grader 100 according to exemplary embodiments of the present embodiment is attached in the above described manner to the vehicle frame 1 via the first joint 41 and the second joint 42. Therefore, even when the vehicle frame 1 elastically deforms, the elastic deformation does not affect the bracket body 2 directly. More specifically, elastic deformation of the vehicle frame 1 propagates to the bracket body 2 through the first joint 41 and the second joint 42. However the first joint 41 and second joint 42 are less rigid than the bracket body 2. Therefore, the first and second joints may suppress the effects on the bracket body of the elastic deformation of the vehicle frame.

MODIFICATION EXAMPLES

Here ends the description of an exemplary embodiment of the present invention; the present invention is not limited to these descriptions, but may be modified in various ways insofar as the modifications do not deviate from the spirit of the present invention.

First Modification Example

In the above exemplary embodiment, the third joint 43 has a different configuration than the first joint 41. However, the third joint 43 is not particularly limited to this configuration. For example, the third joint 43 may have the same configuration as the first joint 41. Similarly, the fourth joint 44 may have the same configuration as the second joint 42.

Second Modification Example

In the above exemplary embodiment, the first joint 41 connects the first rear leg 21b of the bracket body 2 and the first side plate 11, and the third joint 43 connects the first front leg 21a of the bracket body 2 and the first side plate 11. However, the first and third joints are not limited to this configuration. For example, the first joint 41 and the third joint 43 may be switched. Namely the first joint 41 may connect the first front leg 21a of the bracket body 2 and the first side plate 11, and the third joint 43 may connect the first rear leg 21b of the bracket body 2 and the first side plate 11.

Third Modification Example

In the above exemplary embodiment, the second joint 42 connects the second rear leg 22b of the bracket body 2 and the second side plate 12, and the fourth joint 44 connects the second front leg 22a of the bracket body 2 and the second side plate 12. However, the second and fourth joints are not limited to this configuration. For example, the second joint 42 and the fourth joint 44 may be switched. Namely the second joint 42 may connect the second front leg 22a of the bracket body 2 and the second side plate 12, and the fourth joint 44 may connect the second rear leg 22b of the bracket body 2 and the second side plate 12.

Fourth Modification Example

In the above exemplary embodiment the bracket body 2 includes four legs 41-44. However, the bracket body 2 is not limited to this number of legs.

Fifth Modification Example

In the above exemplary embodiment the first joint 41 is secured to the outer surface 11b of the first side plate 11. However, the first joint 41 is not limited to this configuration. For example, the first joint 41 may be secured to the inner surface 11a of the first side plate 11. The second joint 42 may be similarly secured to the inner surface 12a of the second side plate 12.

Sixth Modification Example

In the above exemplary embodiment the joints 41-44 are made from components that are different from the bracket body 2. However, the joints 41-44 are not limited to this configuration. For example, the bracket body 2 and the joints 41-44 may be made from a single component. For example, the first joint 41 may continue and extend from the first rear leg 21b of the bracket body 2.

The invention claimed is:

1. A work vehicle comprising:
   a vehicle frame including a first side plate and a second side plate, the first side plate being arranged on a first side relative to the center in the vehicle width direction and extending in a longitudinal direction, the second side plate being arranged on a second side relative to the center in the vehicle width direction and extending in the longitudinal direction; and
   a support bracket arranged spanning the first side plate and the second side plate, the support bracket supporting an object above the vehicle frame,
   the support bracket including a bracket body, a first joint, and a second joint,
   the bracket body including a first lower end arranged on the first side relative to the center in the vehicle width direction, and a second lower end arranged on the second side relative to the center in the vehicle width direction,
   the first joint extending upward from a side surface of the first side plate and connecting the first lower end and the first side plate, the first joint including
      a first anchor secured to the first side plate at the vertical center part of the first side plate,
      a first pillar arranged next to the first side plate with a gap therebetween and extending upward from the first anchor, and
      a first attachment to which the first lower end is attached, and
   the second joint extending upward from a side surface of the second side plate and connecting the second lower end and the second side plate.

2. The work vehicle according to claim 1, wherein the first attachment extends in the longitudinal direction.

3. The work vehicle according to claim 1, wherein the second joint includes
   a second anchor secured to the second side plate at the vertical center part of the second side plate;
   a second pillar arranged next to the second side plate with a gap therebetween and extending upward from the second anchor; and
   a second attachment to which the second lower end is attached.

4. The work vehicle according to claim 3, wherein the second attachment extends in the longitudinal direction.

5. The work vehicle according to claim 1, wherein the first joint is less rigid than the first lower end; and the second joint is less rigid than the second lower end.

6. The work vehicle according to claim 1, wherein the first lower end includes a first front leg and a first rear leg, the first front leg extending downward, the first rear leg being arranged behind the first front leg and extending downward; and
   the first joint connects the first front leg or the first rear leg, and the first side plate;
   the second lower end includes a second front leg and a second rear leg, the second front leg extending downward, the second rear leg being arranged behind the second front leg and extending downward; and
   the second joint connects the second front leg or the second rear leg, and the second side plate.

7. The work of vehicle according to claim 6, where the support bracket further includes
   a third joint extending upward from a side surface of the first side plate and connecting the first front leg and the first side plate; and
   a fourth joint extending upward from a side surface of the second side plate and connecting the second front leg and the second side plate;
   the first joint connects the first rear leg and the first side plate; and
   the second joint connects the second rear leg and the second side plate.

8. The work vehicle according to claim 7, wherein the third joint is less rigid than the first front leg; and the fourth joint is less rigid than the second front leg.

9. The work vehicle according to claim 1, further comprising
   a first rigid component attached to the inner surface of the first side plate; and
   a second rigid component attached to the inner surface of the second side plate; wherein
   the first joint is attached to the outer surface of the first side plate; and
   the second joint is attached to the outer surface of the second side plate.

10. The work vehicle according to claim 9, wherein in the longitudinal direction, the first joint is attached to the first side plate further behind the front end of the first rigid component, and further in front of the rear end of the first rigid component.

11. The work vehicle according to claim 9, wherein in the longitudinal direction, the second joint is attached to the second side plate further behind the front end of the second rigid component, and further in front of the rear end of the second rigid component.

12. The work vehicle according to claim 2, wherein the second joint includes
   a second anchor secured to the second side plate at the vertical center part of the second side plate;
   a second pillar arranged next to the second side plate with a gap therebetween and extending upward from the second anchor; and
   a second attachment to which the second lower end is attached.

13. The work vehicle according to claim 12, wherein the second attachment extends in the longitudinal direction.

14. The work vehicle according to claim 13, wherein the first joint is less rigid than the first lower end; and the second joint is less rigid than the second lower end.

15. The work vehicle according to claim 14, wherein
the first lower end includes a first front leg and a first rear leg, the first front leg extending downward, the first rear leg being arranged behind the first front leg and extending downward; and
the first joint connects the first front leg or the first rear leg, and the first side plate;
the second lower end includes a second front leg and a second rear leg, the second front leg extending downward, the second rear leg being arranged behind the second front leg and extending downward; and
the second joint connects the second front leg or the second rear leg, and the second side plate.

16. The work of vehicle according to claim 15, wherein
the support bracket further includes
a third joint extending upward from a side surface of the first side plate and connecting the first front leg and the first side plate, and
a fourth joint extending upward from a side surface of the second side plate and connecting the second front leg and the second side plate;
the first joint connects the first rear leg and the first side plate; and
the second joint connects the second rear leg and the second side plate.

17. The work vehicle according to claim 16, wherein
the third joint is less rigid than the first front leg; and
the fourth joint is less rigid than the second front leg.

18. The work vehicle according to claim 17, further comprising
a first rigid component attached to the inner surface of the first side plate; and
a second rigid component attached to the inner surface of the second side plate; wherein
the first joint is attached to the outer surface of the first side plate; and
the second joint is attached to the outer surface of the second side plate.

19. The work vehicle according to claim 18, wherein
in the longitudinal direction, the first joint is attached to the first side plate further behind the front end of the first rigid component, and further in front of the rear end of the first rigid component; and
in the longitudinal direction, the second joint is attached to the second side plate further behind the front end of the second rigid component, and further in front of the rear end of the second rigid component.

* * * * *